UNITED STATES PATENT OFFICE.

HENRI LOUIS HERRENSCHMIDT, OF PETIT QUEVILLY, NEAR ROUEN, FRANCE.

PROCESS OF TREATING MATTES AND ORES.

SPECIFICATION forming part of Letters Patent No. 475,558, dated May 24, 1892.

Application filed September 5, 1891. Serial No. 404,881. (No specimens.)

*To all whom it may concern:*

Be it known that I, HENRI LOUIS HERRENSCHMIDT, metallurgist, of Petit Quevilly, near Rouen, (Seine-Inférieure,) France, have invented new and useful Improvements in the Process of Treating Mattes and Ores for the Separation of Nickel and Cobalt from Copper, of which the following is a full, clear, and exact description.

My invention relates to the treatment of mattes of cobalt, nickel and copper, and of mattes of nickel and copper (applicable also to the protosulphide ores of the same metals) for effecting the separation of the nickel and cobalt from the copper.

I will describe the process as applied to the treatment of mattes of cobalt, nickel, and copper. The mattes are first crushed and a part of the crushed matte is then subjected to a methodical roasting for the purpose of sulphating or chloridizing the metals contained in the ordinary way. The roasting may also be complete, in which case it is only necessary to attack the roasted matte by an acid in order to sulphate or chloridize the metals contained. Whatever may, however, be the mode of roasting employed, the metallic salts are recovered by means of water, so as to form a liquor composed either of the sulphates or chlorides of cobalt, nickel, and copper. It is to be observed that these liquors generally contain iron, the mattes from which they are obtained always containing a certain proportion of this metal, except when the iron has been eliminated by one of the known processes—such as, for example, by the Bessemer blowing process. The liquor obtained, whether containing sulphates of cobalt, nickel, and copper, (with or without iron,) or chlorides of the same metals, is brought into contact with a portion of the original matte which has not been roasted. The following reaction then takes place: The copper in the liquor precipitates as metallic copper and is replaced by an equivalent proportion of the metals cobalt, nickel, and iron contained in the raw matte. If such a quantity of the raw matte has been employed that the aggregate of the three metals (cobalt, nickel, and iron) contained therein is more than sufficient to displace all the copper in the liquor, the whole of the copper will be integrally precipitated in the metallic state, and at the close of the operation there will only remain in the liquor cobalt, nickel, and iron. The iron (if any) contained in the sulphate or chloride of cobalt and nickel liquor may be precipitated in any of the known ways. It is preferred to separate it by adding to the liquor either peroxide of nickel or peroxide of cobalt, or a mixture of these peroxides. The addition of these peroxides leads in effect to the precipitation of the iron, while the two metals, nickel and cobalt, become dissolved. In this manner a liquor is ultimately obtained containing nickel and cobalt only, the separation of which metals is effected by the process described in a previous application for Letters Patent filed by me on the 13th day of May, 1891, and serially numbered 392,591.

In treating protosulphide ores of cobalt, nickel, and copper, which are analogous in composition to that of the mattes, the process is conducted in an exactly similar way to that above described.

When the matte to be treated contains only nickel and copper with iron, the several operations are exactly similar, the only difference being that the final liquor contains nickel and iron only, the iron being separated, if desired, by means of peroxide of nickel, which precipitates the iron while the nickel becomes dissolved. The nickel may then be precipitated from the liquor, or it may be obtained in the form of an oxide by evaporating the liquor and calcining the residue. If the calcination be performed in a closed chamber the acid set free may easily be recovered.

The operation may also be equally well conducted without previously separating the iron from the nickel and iron liquor by simply evaporating the liquor and calcining the residual salts of nickel and iron, so as to decompose only the salt of iron. By then treating the calcined residue with water the nickel salt alone becomes redissolved. This latter method of proceeding by evaporation of the nickel and iron liquor is the more practical, as it allows of operating on liquors at from 30° to 40° Baumé. Protosulphide ores of nickel, copper, and iron of a composition analogous to that of the mattes are treated in an exactly-similar way.

Having now particularly described and ascertained the nature of the said invention and in what manner the same is to be performed, I declare that what I claim is—

1. The herein-described process of precipitating copper in metallic form from cobalt, nickel, and copper acid solutions, which consists in adding to said acid solutions the ore of the metals to remain in solution, substantially as described.

2. The herein-described process of precipitating copper in metallic form from nickel and copper acid solutions, which consists in adding to said solution protosulphide ore of copper and nickel, substantially as described.

3. The herein-described process of separating copper from cupriferous ores containing cobalt or nickel, which consists in, first, crushing and roasting the ore to be treated; second, sulphating or acidifying said roasted ore; third, adding water to form an acid solution of said roasted ore, and, finally, adding to said solution a portion of the original ore to precipitate the copper, substantially as described.

The foregoing specification of my improvements in the treatment of certain mattes and ores for the separation of nickel and cobalt from copper signed by me this 18th day of August, 1891.

HENRI LOUIS HERRENSCHMIDT.

Witnesses:
ROBT. M. HOOPER,
    *Vice-Consul-General, Paris.*
ALBERT MOREAU.